3,098,002
METHOD OF CONTROLLING FUNGI AND ALGAE WITH N-PHENYL-ITACONIMIDES
John A. Riddell and Bogislav von Schmeling, both of Hamden, Conn., assignors to United States Rubber Company, New York, N.Y., a corporation of New Jersey
No Drawing. Filed Oct. 12, 1961, Ser. No. 144,577
20 Claims. (Cl. 167—33)

This invention relates to fungicides and algaecides. It relates particularly to seed protectants and soil fungicides for protecting seeds and seedlings emerging from seeds against attack by fungi, and also to foliage fungicides. It also relates to fabric fungicides. It also relates to fungus resistant paints and anti-fouling marine paints.

We have found that N-phenylitaconimide, N-(chlorophenyl)itaconimides, N-(alkylphenyl)itaconimides, N-(alkoxyphenyl)itaconimides, N-(carboxyphenyl)itaconimides, N-(carbalkoxyphenyl)itaconimides, and N,N'-phenylene bisitaconimides are effective fungicides and algaecides. The alkyl groups in the alkyl, alkoxy, and carbalkoxy substituents on the phenyl radical may have from 1 to 12 carbon atoms.

Examples of itaconimides that may be used as fungicides and algaecides according to the present invention are N-phenylitaconimide, N-(2-chlorophenyl)itaconimide, N-(3-chlorophenyl)itaconimide, N-(4-chlorophenyl)itaconimide, N-(2,4-dichlorophenyl)itaconimide, N-(2,5-dichlorophenyl)itaconimide, N-(4-methylphenyl)itaconimide, N-(2-ethylphenyl)itaconimide, N-(4-dodecylphenyl)itaconimide, N-(2,6-dimethylphenyl)itaconimide, N-(2-methoxyphenyl)itaconimide, N-(4-methoxyphenyl)itaconimide, N-(3-carboxyphenyl)itaconimide, N-(4-carboxyphenyl)itaconimide, N-(4-carbethoxyphenyl)itaconimide and N,N'-(1,3-phenylene)bisitaconimide.

The chemical may be applied to seeds by tumbling the chemical with the seeds, either alone or in admixture with a powdered solid carrier, to coat the seeds. Typical powdered solid carriers are the various mineral silicates, e.g. mica, talc, pyrophyllite, and clays. The chemical may also be applied to the seeds in admixture with a conventional surface-active wetting agent, with or without additional powdered solid carrier, as by first wetting the mixture with a small amount of water and then tumbling the seeds in the slurry. The surface-active wetting agents that may be used with the chemical may be any of the conventional anionic, non-ionic, or cationic surface-active agents. Such surface-active agents are well known and reference is made to U.S. Patent No. 2,547,724, columns 3 and 4, for detailed examples of the same. As a seed protectant, the amount of the chemical coated on the seeds will be 1 to 10 ounces per hundred pounds of the seed. As a soil fungicide, the chemical may be applied as a dust in admixture with said or dirt or a powdered solid carrier such as a mineral silicate, with or without an additional surface-active wetting agent, to the furrows with the planting of the seeds, or the chemical may be applied as an aqueous spray, if desired including a surface-active dispersing agent, or a surface-active dispersing agent and a powdered solid carrier, to the seed rows before, or with, or after planting the seeds. As a soil fungicide, the amount of the chemical applied to the seed rows will be from ½ to 5 pounds per acre applied to the seed rows the equivalent of an area 2" wide and 2" deep to parallel rows in one direction a distance of 40" apart. Also, as a soil fungicide, the chemical may be applied broadcast as a similar dust or aqueous spray with an application rate of 10 to 200 pounds per acre. As a foliage fungicide, the chemical may be applied to growing plants at a rate of ¼ to 10 pounds per acre. Such application is generally as an aqueous spray which also contains a surface-active dispersing agent, or a surface-active dispersing agent and a powdered solid carrier. As a paint fungicide, and as an anti-fouling agent for marine paints, the chemical will generally be added to the paint in an amount from 0.5 to 15% based on the weight of the solids of the paint, which will be substantially the amount present in the dried paint coating. As a fabric fungicide, the chemical will be incorporated in the fabric generally in amount from 0.1% to 10% of the weight of the fabric. As an algaecide, the chemical is applied to the algae by adding the chemical to the water in amount to give the concentration in the water that will kill the desired proportion of the algae existing in the water. The concentration of algaecide will generally be from 0.5 to 50 parts per million (p.p.m.) of the water containing the algae.

The N-aryl itaconimides (i.e. the N-phenyl and the N-(substituted phenyl)itaconimides), are prepared by reacting the selected aromatic primary monoamine with itaconic anhydride to form the N-aryl itaconic acid which is reacted with acetic anhydride and sodium acetate to form the N-aryl itaconimide. The N,N'-phenylene bisitaconimides are prepared by reacting the selected phenylenediamine with itaconic anhydride to form the N,N'-phenylene bisitaconamic acid which is reacted with acetic anhydride and sodium acetate to form the N,N'-phenylene bisitaconimide.

Illustrative preparations of chemicals of the present invention are described below.

N-phenylitaconimide was prepared as follows:

To a solution of 22.4 grams of itaconic anhydride in a small amount of benzene was added 18.8 grams of aniline in a little benzene. A precipitate immediately formed and after the mixture was stirred for a few minutes the precipitate of N-phenylitaconamic acid was filtered off, washed with benzene and air dried to yield 40 grams of light colored solid. Recrystallization from dioxane gave a white solid, M.P. 165–167° C.; percent N, found 6.76%, theory 6.82%; neutral equivalent, found 205, theory 204.

One hundred grams of the N-phenylitaconamic acid, 16 grams of sodium acetate and 300 grams of acetic anhydride were heated to 90° C. for one-half hour then poured into cold water to yield 69 grams of a brown, tacky solid. This was extracted with cyclohexane and the extract concentrated and cooled to yield 29 grams of white solid, M.P. 85–115° C. This N-phenylitaconimide was recrystallized from 95% ethanol several times to yield 16 grams of a white solid, M.P. 120–122° C.; percent N, found 7.59%, theory 7.51%.

N-(4-chlorophenyl)itaconimide was prepared as follows:

To a solution of 66 grams of itaconic anhydride in 2 liters of benzene gradually was added, at room temperature with stirring, 63.5 grams of a solution of p-chloroaniline in 500 ml. of benzene. Within a few minutes the N-(4-chlorophenyl)itaconamic acid (96 grams) precipitated as a white solid, melting at 175–185° C. and was filtered off, washed with benzene and air dried. It was purified by recrystallization from a 50/50 (by volume) mixture of tetrahydrofuran and benzene to give the product as a white solid, M.P. 191–193° C.; percent N, found 5.87%, theory 5.85%; neutral equivalent, found 239, theory 239.

Thirty grams of the above pure N-(4-clorophenyl)

itaconamic acid, 5 grams of sodium acetate and 75 grams of acetic anhydride were heated to about 100° C. for one-half hour. The resulting brown solution, containing a little undissolved sodium acetate, was poured into 500 ml. of water to precipitate a friable solid. This solid was filtered off and the wet cake taken up in hot cyclohexane, concentration and cooling of the cyclohexane solution gave 19 grams of white solid, melting at 90–133° C. After several recrystallizations from ethanol there was obtained 9 grams of the desired N-(4-chlorophenyl) itaconimide as a white solid, M.P. 133–135° C.; percent N, found 6.21%, theory 6.33%, percent chlorine, found 14.78%, theory 15.56%.

N-(2,6-dimethylphenyl)itaconimide was prepared as follows:

To 66 grams of itaconic anhydride in 2 liters of benzene was added 59.5 grams of 2,6-dimethylaniline in 500 ml. of benzene. The mixture was heated to reflux for ½ hour. The precipitate of N-(2,6-dimethylphenyl) itaconamic acid which formed was filtered off, washed with benzene and dried to yield 72 grams. Recrystallization from tetrahydrofuran/benzene 50/50 by volume gave 53 grams of white solid, M.P. 195° C.; percent N, found 5.86%, theory 5.96%; neutral equivalent, found 233, theory 234.

Thirty-one grams of N-(2,6-dimethylphenyl)-itaconamic acid, 6 grams of sodium acetate and 140 grams of acetic anhydride was heated to 90–100° C. for 30 minutes and then poured into cold water. The crude solid was extracted with cyclohexane and the extract worked up to yield 21 grams of light yellow solid, M.P. 90–128° C. After several recrystallizations of the N-(2,6-dimethylphenyl)itaconimide from ethanol and from cyclohexane, there was obtained 10 grams of nearly white solid, M.P. 129–131° C.; percent N, found 6.62%, theory 6.51%.

N-(4-methoxyphenyl)itaconimide was prepared as follows:

To a solution of 112 grams of itaconic anhydride in 1500 ml. of benzene was slowly added at room temperature with stirring, a solution of 123 grams of p-methoxyaniline in 500 ml. of benzene. The resultant white solid was filtered, washed with benzene and air dried to yield 239 grams of N(4-methoxyphenyl)itaconamic acid as a white solid melting at 167–168° C. A sample recrystallized from 50% aqueous acetone (by volume) melted at 171–172° C.; percent N, found 5.9%, theory 5.9%.

A mixture of 118 grams of the above N-(4-methoxyphenyl)itaconamic acid, 21 grams of anhydrous sodium acetate and 500 ml. of acetic anhydride was heated to 70° C. for one hour and thereafter cooled and stirred into 3.5 liters of water. The precipitated solids were composed of 19 grams of light yellow solid and 95 grams of a dark brown lumpy solid. The former was separated by decantation, filtered and recrystallized from isopropanol to yield 16 grams of the desired N-(4-methoxyphenyl)-itaconimide as yellow crystals melting at 113–114° C.; percent N, found 6.3%, theory 6.5%.

N,N'-(1,3-phenylene)bisitaconimide was prepared as follows:

A solution of 54 grams of meta-phenylenediamine in 250 ml. of warm chloroform was stirred into a solution of 112 grams of itaconic anhydride in 500 ml. of warm benzene. The exothermic reaction was held to 50–55° C. by cooling as needed. The precipitate of N,N'-(1,3-phenylene)bisitaconamic acid which formed was filtered off, washed with benzene and air dried to yield 159 grams of light gray solid, M.P. 210–215° C.; percent N, found 8.64%, theory 8.43%; neutral equivalent, found 176, theory 166. A mixture of 16.6 grams of the N,N'-(1,3-phenylene)bisitaconamic acid, 2 grams of sodium acetate and 50 grams of acetic anhydride was heated to 105–110° C. for about 15 minutes during which time a brown solution containing undissolved sodium acetate was formed. The warm solution was stirred into water, producing a precipitate which was filtered off, washed with water and air dried to yield 10 grams of light tan solid. This N,N'-(1,3-phenylene)bisitaconimide was recrystallized several times from acetic acid/water 50/50 by volume. Percent N, found 9.17%, theory 9.46%. The product did not melt when slowly heated on the Fisher-Johns apparatus but when dropped on the preheated apparatus formed a temporary melt in the neighborhood of 210° C.

The following examples illustrate the invention. All parts and percentages referred to herein are by weight.

*Example 1*

This example evaluates various chemicals of the present invention as seed protectants and soil fungicides as measured by their disease control of seeds planted in infested soil by the following test:

Two hundred and sixty-four mg. of the chemical were thoroughly mixed in a glass jar with one pound of clean, dry said. The mixing was accomplished by vigorously shaking the jar which was covered with a screwcap. This masterbatch was then mixed with 6¼ pounds of infested soil to give an 80 p.p.m. (parts per million) concentration of chemical in the soil-sand mixture. The soil used for the chemical treatment was highly infested with a complex of organisms which cause rotting of seeds, such as Pythium spp., Fusarium spp., and Rhizoctonia spp. The incorporation of the masterbatch containing the chemical into the infested soil took place in a tumbler which was allowed to rotate for five minutes for each mixing operation. This mixing time gave a thorough and even incorporation of the chemical into the infested soil. The treated soil was then placed into five 4″ pots in which five pea seeds per pot were planted about ½″ deep covered with infested, treated soil, i.e. a total of 25 seeds were planted for each chemical soil treatment. An untreated check, replicated five times, in which seeds were planted in the same infested soil but without the chemical treatment was included in the test. Also a check, replicated five times, was included where seeds were planted in sterilized soil without chemical treatment. After the planting was completed, the pots were then transferred to the greenhouse and kept under moist conditions. The results were taken ten to fourteen days later by counting the number of emerged pea seedlings.

The formula for the determination of the percent disease control is:

$$\text{Percent control} = \frac{A-B}{C-B} \times 100$$

where $A$=percent germination in chemically treated infested soil.
$B$=percent germination in untreated infested soil.
$C$=percent germination in untreated sterile soil.

The following table gives the percent disease control of various chemicals of the present invention at a concentration in soil of 80 p.p.m., which is equivalent to an application rate of 2.4 lbs./acre of the chemicals applied to the seed rows the equivalent of an area 2″ wide and 2″ deep to parallel rows in one direction a distance of 40″ apart.

| Chemical: | Disease control percent |
|---|---|
| N-phenylitaconimide | 90 |
| N-(2,6-dimethylphenyl)itaconimide | 80 |
| N-(4-chlorophenyl)itaconimide | 100 |
| N-(4-carbethoxyphenyl)itaconimide | 89 |
| N,N'-(1,3-phenylene)bisitaconimide | 100 |
| N-(4-methylphenyl)itaconimide | 88 |
| N-(2-methoxyphenyl)itaconimide | 100 |
| N-(4-methoxyphenyl)itaconimide | 100 |
| N-(2-chlorophenyl)itaconimide | 88 |
| N-(2,5-dichlorophenyl)itaconimide | 88 |

Example 2

This example evaluates various chemicals of the present invention by their ability to prevent pre- and post-emergence damping-off of plant seedlings.

The infested soil was treated with the various chemicals at 20 p.p.m. as in Example 1. Cotton seed was planted in the treated soils as in Example 1 using 5 seeds per 4" pot and five pots per treatment. An untreated infested soil check replicated five times, was included in the test. After the planting was completed the pots were then transferred to the greenhouse and watered. Three to four days later the cotton seedlings began to emerge. At the time the seedlings broke through the ground and were in the crookstage, the results of the emergence were recorded and the test was transferred to a control chamber which had 100% relative humidity and 55° F. temperature for a period of three days. The high humidity and the low temperature produce an active growth of the soil organisms while these conditions were unfavorable for the growth of the cotton. The result was that the cotton seedlings in the untreated infested soil damped off. The test was then returned to the greenhouse.

About five days after the test was returned to the greenhouse, the results were taken by comparing the growth or stand of the cotton in the treated soil with that of the untreated infested soil. The results were recorded as percent emergence before placement in the chamber at 55° F. and percent stand after three days in the chamber at 55° F. and five days in the greenhouse.

The following table gives the percent emergence and percent stand for the treated infested soil as compared to the untreated infested soil check.

| Chemical | Percent Emergence | Percent Stand |
| --- | --- | --- |
| N-phenylitaconimide | 60 | 60 |
| N-(2,6-dimethylphenyl)itaconimide | 52 | 56 |
| N-(3-chlorophenyl)itaconimide | 76 | 72 |
| N-(4-chlorophenyl)itaconimide | 56 | 56 |
| N,N'-(1,3-phenylene)bisitaconimide | 44 | 40 |
| Untreated infested soil (check) | 32 | 16 |

Example 3

This example evaluates the chemicals of the present invention as foliage fungicides by their ability to protect plants from subsequent infection by fungus diseases.

One gram of the chemical to be tested was ground with three ml. of acetone and 50 mg. of a non-ionic surface-active agent (a condensation product of an alkyl phenol and ethylene oxide). The acetone and surface-active agent are known to be inactive in the biological tests run. The mixture was diluted with water, giving suspensions containing 500 and 2000 p.p.m. of the chemical. These suspensions were sprayed on duplicate six inch tomato plants (variety Clark's Early Special) using a gun-type sprayer which delivered 2.5 ml. per second. The plants were then placed in the greenhouse, together with untreated check plants. Twenty-four hours later the treated and untreated check plants were inoculated with a suspension of *Alternaria solani* spores by means of a 20 second spray from an atomizer sprayer (delivery rate 1 ml. per second). The plants were then kept overnight in a control chamber at a temperature of 75° F. and 100% relative humidity. In the morning the plants were transferred to the greenhouse. Three days later the disease was scored by comparing the number of disease lesions of the treated plants with the untreated check.

The formula to determine percent control is:

$$100 - \left(\frac{\text{Avg. no. lesions on treated plant}}{\text{Avg. no. lesions on untreated plant}} \times 100\right) = \text{percent control}$$

The results of the tests are shown in the following table:

| Chemical | Percent Disease Control at p.p.m. | |
| --- | --- | --- |
| | 500 | 2,000 |
| N-phenylitaconimide | 88 | 99.1 |
| N-(2,6-dimethylphenyl)itaconimide | 99.9 | 99.7 |
| N-(3-chlorophenyl)itaconimide | 98.5 | 99.2 |
| N-(4-chlorophenyl)itaconimide | 97 | 99.3 |
| N-(4-carboxyphenyl)itaconimide | 45 | 80.3 |
| N-(4-carbethoxyphenyl)itaconimide | 91.4 | 98.7 |
| N,N'-(1,3-phenylene)bisitaconimide | 92 | 99 |
| N-(3-methylphenyl)itaconimide | 25 | 93.5 |
| N-(4-methylphenyl)itaconimide | 72 | 99.6 |
| N-(2-methoxyphenyl)itaconimide | 63.5 | 97.5 |
| N-(4-methoxyphenyl)itaconimide | 75.5 | 99.1 |
| N-(2-chlorophenyl)itaconimide | 90.2 | 99.8 |
| N-(2,5-dichlorophenyl)itaconimide | 96.9 | 99.9 |

Example 4

This example illustrates the effectiveness of the chemicals of the present invention as fabric fungicides.

Strips 1" wide and 6" long of 6 oz. white cotton duck were immersed in 0.5% and 1% solutions of N-nitrophenylitaconimide, N-(4-chlorophenyl)itaconimide and N-(4-methylphenyl)itaconimide in acetone five minutes. The strips were removed and dried. The amount of chemical incorporated in the strips immersed in the 0.5% and 1% solutions was about 1.25% and 2.5%, respectively, based on the weight of the fabric. The dried strips and the untreated control strips were buried in infested soil contained in 6" pots to a depth of 3". The soil was infested with organisms such as *Chaetomium globosum*, *Aspergillus* spp., and *Pencillium* spp. The pots were then placed in a chamber at a constant temperature of 86° F. and a 100% relative humidity.

Three weeks after burial, the fabrics were examined to determine their resistance to microbiological deterioration. The untreated control strips broke when pulling from the soil and the fabric was deteriorated and discolored. None of the strips treated with the chemicals of the invention broke when removed from the soil. The strips treated with the 0.5% and 1% solutions of N-phenylitaconimide showed no signs of deterioration or discoloration. The strips treated with the 0.5% and 1% solutions of N-(4-chlorophenyl)itaconimide showed slight deterioration but no discoloration. The strips treated with the 0.5% solution of N-(4-methylphenyl)-itaconimide showed slight deterioration but no discoloration, and the strips treated with the 1% solution of N-(4-methylphenyl)itaconimide showed no signs of deterioration or discoloration. A similar test with copper-8-quinolinolate, a commercial fabric fungicide, showed no deterioration of the fabric but the fabric was highly discolored to a greenish brown color.

Example 5

This example illustrates the effectiveness of the chemicals of the present invention as paint fungicides.

To samples of an acrylate resin latex paint of 55% solids in aqueous medium containing no mildewcide were added 0.5% and 0.75% based on the weight of the paint of various chemicals of the present invention, i.e. about 0.9% and 1.4%, respectively, of the chemicals based on the weight of the solids of the paint. A control sample of the paint was left untreated. To another sample of the paint was added 0.5% and 0.75% based on the weight of the paint of phenyl mercury oleate, which is a commercial mildewcide, i.e. about 0.9% and 1.4%, respectively, of the chemical based on the weight solids of the paint. Wooden stakes 25 cm. long, 1.5 cm. wide and 0.25 cm. thick were coated with the various paint samples. The stakes were allowed to dry at room temperature and were then transferred to a chamber where they were exposed to a continuous mist of water at a temperature of 86° F.

Twenty-five days later, the stakes were examined for mildew growth on the paint coatings and the results recorded by rating the severity of the fungus growth. The stakes painted with the untreated control paint showed severe growth of mildew organisms. The rating of fungus growth on the stakes covered with the paint coating containing the 0.9% and 1.4% of the chemicals of the present invention and of the phenyl mercury oleate is shown in the following table:

| Chemical | Rating of Fungus Growth | |
|---|---|---|
| | At 0.5% in Paint Coating | At 0.75% in Paint Coating |
| N-phenylitaconimide | Slight | None. |
| N-(4-chlorophenyl)itaconimide | Trace | Trace. |
| N-(4-methylphenyl)itaconimide | Slight | None. |
| Phenyl mercury oleate | Moderate | Moderate. |

The growth of mildew organisms on the stakes painted with the paint containing phenyl mercury oleate was much greater than on the stakes painted with the paint containing the chemicals of the present invention. The examination showed that the chemicals of the present invention gave much better protection of the paint from mildew attack than the commercial phenyl mercury oleate.

The chemicals of the present invention may also be incorporated in marine paints as anti-fouling additives to prevent attack of paint coatings under water by crustaceans, such as barnacles.

*Example 6*

This example illustrates the effectiveness of the chemicals of the present invention as algaecides.

Aqueous suspensions of the chemicals were prepared by mixing 20 mg. of the chemical in 2 ml. of ethyl alcohol and diluting with 198 ml. of water. These suspensions were added to algae cultures in water in 250 ml. flasks in which approximately the same number of algae were present to give 20 p.p.m. concentration of the chemicals. The culture used contained the following algae: *Ankistrodemus-falcatus* (blue green algae), Oscillatoria spp. (blue green algae), Chlorella (green algae), Lepodinclis spp. (flagellate), and diatoms.

The effectiveness of the various chemicals was determined 3 and 14 days later by estimating the percent kill by visual observation compared to untreated check flasks. The results are shown in the following table:

| Chemical | Percent Killed After— | |
|---|---|---|
| | 3 Days | 14 Days |
| N-phenylitaconimide | 95 | 100 |
| N-(2,6-dimethyphenyl)itaconimide | 95 | 100 |
| N-(3-chlorophenyl)itaconimide | 100 | 100 |
| N-(4-chlorophenyl)itaconimide | 100 | 70 |

This application is a continuation-in-part of application Serial No. 86,315, filed February 1, 1961, now abandoned.

Having thus described our invention, what we claim and desire to protect by Letters Patent is:

1. The method of protecting seeds and seedlings emerging from seeds against attack by fungi which comprises bringing the seeds into contact with a chemical selected from the group consisting of N-phenylitaconimide, N-(chlorophenyl)itaconimides having only chlorine substitution in the phenyl radical, N-(alkylphenyl)itaconimides having only alkyl substitution in the phenyl radical, N-(alkoxyphenyl)itaconimides having only alkoxy substitution in the phenyl radical, N-(carboxyphenyl)itaconimides having only carboxy substitution in the phenyl radical, N-(carbalkoxyphenyl)itaconimides having only carbalkoxy substitution in the phenyl radical, and N,N'-phenylene bisitaconimides having only unsubstituted phenylene radicals attached to the nitrogens.

2. The method of protecting seeds and seedlings emerging from seeds against attack by fungi which comprises coating the seeds with a chemical selected from the group consisting of N-phenylitaconimide, N-(chlorophenyl)itaconimides having only chlorine substitution in the phenyl radical, N-(alkylphenyl)itaconimides having only alkyl substitution in the phenyl radical, N-(alkoxyphenyl)itaconimides having only alkoxy substitution in the phenyl radical, N-(carboxyphenyl)itaconimides having only carboxy substitution in the phenyl radical, N-(carbalkoxyphenyl)itaconimides having only carbalkoxy substitution in the phenyl radical, and N,N'-phenylene bisitaconimides having only unsubstituted phenylene radicals attached to the nitrogens.

3. The method of protecting seeds and seedlings emerging from seeds against attack by fungi which comprises applying a chemical selected from the group consisting of N-phenylitaconimide, N-(chlorophenyl)itaconimides having only chlorine substitution in the phenyl radical, N-(alkylphenyl)itaconimides having only alkyl substitution in the phenyl radical, N-(alkoxyphenyl)itaconimides having only alkoxy substitution in the phenyl radical, N-(carboxyphenyl)itaconimides having only carboxy substitution in the phenyl radical, N-(carbalkoxyphenyl)itaconimides having only carbalkoxy substitution in the phenyl radical, and N,N'-phenylene-bisitaconimides having only unsubstituted phenylene radicals attached to the nitrogens to soil in the area in which seeds are planted before germination of the seeds.

4. The method of protecting seeds and seedlings emerging from seeds against attack by fungi which comprises applying a chemical selected from the group consisting of N-phenylitaconimide, N-(chlorophenyl)itaconimides having only chlorine substituted in the phenyl radical, N-(alkylphenyl)itaconimides having only alkyl substitution in the phenyl radical, N-(alkoxyphenyl)itaconimides having only alkoxy substitution in the phenyl radical, N-(carboxyphenyl)itaconimides having only carboxy substitution in the phenyl radical, N-(carbalkoxyphenyl)itaconimides having only carbalkoxy substitution in the phenyl radical, and N,N'-phenylene bisitaconimides having only unsubstituted phenylene radicals attached to the nitrogens to soil in the area in which seeds are planted before emergence of seedlings.

5. The method of controlling fungi on plants which comprises applying a chemical selected from the group consisting of N-phenylitaconimide, N-(chlorophenyl)itaconimides having only chlorine substitution in the phenyl radical, N-(alkylphenyl)itaconimides having only alkyl substitution in the phenyl radical, N-(alkoxyphenyl)itaconimides having only alkoxy substitution in the phenyl radical, N-(carboxyphenyl)itaconimides having only carboxy substitution in the phenyl radical, N-(carbalkoxyphenyl)itaconimides having only carbalkoxy substitution in the phenyl radical, and N,N'-phenylene bisitaconimides having only unsubstituted phenylene radicals attached to the nitrogens to the plants at a rate of ¼ to 10 pounds per acre.

6. The method of controlling fungi on growing plants which comprises applying a chemical selected from the group consisting of N-phenylitaconimide, N-(chlorophenyl)itaconimides having only chlorine substitution in the phenyl radical, N-(alkylphenyl)itaconimides having only alkyl substitution in the phenyl radical, N-(alkoxyphenyl)itaconimides having only alkoxy substitution in the phenyl radical, N-(carboxyphenyl)itaconimides having only carboxy substitution in the phenyl radical, N-(carbalkoxyphenyl)itaconimides having only carbalkoxy substitution in the phenyl radical, and N,N'-phenylene bisitaconimides having only unsubstituted phenylene radicals attached to the nitrogens to the growing plants at a rate of ¼ to 10 pounds per acre.

7. The method of protecting seeds and seedlings emerging from seeds against attack by fungi which comprises bringing the seeds into contact with N-phenylitaconimide.

8. The method of protecting seeds and seedlings emerging from seeds against attack by fungi which comprises coating the seeds with an N-(chlorophenyl)itaconimide having only chlorine substitution in the phenyl radical.

9. The method of protecting seeds and seedlings emerging from seeds against attack by fungi which comprises applying an N-(methylphenyl)itaconimide having only methyl substitution in the phenyl radical to soil in the area in which seeds are planted before germination of the seeds.

10. The method of protecting seeds and seedlings emerging from seeds against attack by fungi which comprises applying N-(2,6-dimethylphenyl)itaconimide to soil in the area in which seeds are planted before emergence of seedlings.

11. The method of controlling fungi on plants which comprises applying N-phenylitaconimide to the plants at a rate of ¼ to 10 pounds per acre.

12. The method of controlling fungi on growing plants which comprises applying N-(2,6-dimethylphenyl)itaconimide to the growing plants at a rate of ¼ to 10 pounds per acre.

13. The method of preventing microbiological deterioration of fabric which comprises treating fabric with a chemical selected from the group consisting of N-phenylitaconimide, N-(chlorophenyl)itaconimides having only chlorine substitution in the phenyl radical, N-(alkylphenyl)itaconimides having only alkyl substitution in the phenyl radical, N-(alkoxyphenyl)itaconimides having only alkoxy substitution in the phenyl radical, N-(carboxyphenyl)itaconimides having only carboxy substitution in the phenyl radical, N-(carbalkoxyphenyl)itaconimides having only carbalkoxy substitution in the phenyl radical, and N,N'-phenylene bisitaconimides having only unsubstituted phenylene radicals attached to the nitrogens.

14. Fabric having incorporated therein 0.1% to 10% of a chemical selected from the group consisting of N-phenylitaconimide, N-(chlorophenyl)itaconimides having only chlorine substitution in the phenyl radical, N-(alkylphenyl)itaconimides having only alkyl substitution in the phenyl radical, N-(alkoxyphenyl)itaconimides having only alkoxy substitution in the phenyl radical, N-(carboxyphenyl)itaconimides having only carboxy substitution in the phenyl radical, N-(carbalkoxyphenyl)itaconimides having only carbalkoxy substitution in the phenyl radical, and N,N'-phenylene bisitaconimides having only unsubstituted phenylene radicals attached to the nitrogens.

15. Fabric having incorporated therein 0.1% to 10% of an N-(chlorophenyl)itaconimide having only chlorine substitution in the phenyl radical.

16. The method of protecting paint coatings from deterioration which comprises incorporating therein a chemical selected from the group consisting of N-phenylitaconimide, N-(chlorophenyl)itaconimides having only chlorine substitution in the phenyl radical, N-(alkylphenyl)itaconimides having only alkyl substitution in the phenyl radical, N-(alkoxyphenyl)itaconimides having only alkoxy substitution in the phenyl radical, N-(carboxyphenyl)itaconimides having only carboxy substitution in the phenyl radical, N-(carbalkoxyphenyl)itaconimides having only carbalkoxy substitution in the phenyl radical, and N,N'-phenylene bisitaconimides having only unsubstituted phenylene radicals attached to the nitrogens.

17. Paint containing 0.5% to 15% based on the weight of the solids of the paint of a chemical selected from the group consisting of N-phenylitaconimide, N-(chlorophenyl)itaconimides having only chlorine substitution in the phenyl radical, N-(alkylphenyl)itaconimides having only alkyl substitution in the phenyl radical, N-(alkoxyphenyl)itaconimides having only alkoxy substitution in the phenyl radical, N-(carboxyphenyl)itaconimides having only carboxy substitution in the phenyl radical, N-(carbalkoxyphenyl)itaconimides having only carbalkoxy substitution in the phenyl radical, and N,N'-phenylene bisitaconimides having only unsubstituted phenylene radicals attached to the nitrogens.

18. Paint containing 0.5% to 15% of an N-(chlorophenyl)itaconimide having only chlorine substitution in the phenyl radical based on weight of the solids of the paint.

19. The method of killing algae in water which comprises applying to said algae a chemical selected from the group consisting of N-phenylitaconimide, N-(chlorophenyl)itaconimides having only chlorine substitution in the phenyl radical, N-(alkylphenyl)itaconimides having only alkyl substitution in the phenyl radical, N-(alkoxyphenyl)itaconimides having only alkoxy substitution in the phenyl radical, N-(carboxyphenyl)itaconimides having only carboxy substitution in the phenyl radical, N-(carbalkoxyphenyl)itaconimides having only carbalkoxy substitution in the phenyl radical, and N,N'-phenylene bisitaconimides having only unsubstituted phenylene radicals attached to the nitrogens.

20. The method of killing algae in water which comprises applying N-phenylitaconimide to said algae.

References Cited in the file of this patent

UNITED STATES PATENTS

| | | |
|---|---|---|
| 2,521,720 | Hill | Sept. 12, 1950 |
| 2,726,981 | Wolf et al. | Dec. 13, 1955 |
| 2,757,119 | Bennett et al. | July 31, 1956 |
| 2,989,436 | O'Brein et al. | June 20, 1961 |
| 3,004,036 | Fan et al. | Oct. 10, 1961 |